United States Patent
Glogovsky et al.

(10) Patent No.: US 9,290,646 B2
(45) Date of Patent: Mar. 22, 2016

(54) MOLDED ARTICLES (INCLUDING AUTOMOBILE PARTS) AND RELATED FILLED THERMOPLASTIC POLYOLEFIN COMPOSITIONS

(71) Applicant: Equistar Chemicals, LP, Houston, TX (US)

(72) Inventors: Todd A. Glogovsky, Sao Jose Dos Campos (BR); Brent Mrozinski, Lansing, MI (US)

(73) Assignee: Equistar Chemicals, LP, Houston, TX (US)

( * ) Notice: Subject to any disclaimer, the term of this patent is extended or adjusted under 35 U.S.C. 154(b) by 237 days.

(21) Appl. No.: 14/046,526

(22) Filed: Oct. 4, 2013

(65) Prior Publication Data
US 2015/0099840 A1   Apr. 9, 2015

(51) Int. Cl.
*C08L 23/12*   (2006.01)
*C08L 23/14*   (2006.01)
*C08L 53/02*   (2006.01)

(52) U.S. Cl.
CPC ..................... *C08L 23/12* (2013.01)

(58) Field of Classification Search
CPC ................................ C08L 23/14; C08L 23/12
USPC ................................................ 524/400, 451
See application file for complete search history.

(56) References Cited

U.S. PATENT DOCUMENTS

| | | | |
|---|---|---|---|
| 6,214,934 B1 * | 4/2001 | Moriya et al. | 525/89 |
| 6,429,250 B1 | 8/2002 | Rohrmann | |
| 7,226,977 B2 | 6/2007 | Kim et al. | |
| 8,058,350 B2 | 11/2011 | Berta et al. | |
| 2005/0234196 A1 | 10/2005 | Kim et al. | |
| 2006/0047071 A1 | 3/2006 | Pelliconi et al. | |
| 2007/0078224 A1 | 4/2007 | Dominic et al. | |
| 2007/0287813 A1 * | 12/2007 | Meverden et al. | 526/125.3 |
| 2008/0045638 A1 * | 2/2008 | Chapman et al. | 524/425 |
| 2008/0312375 A1 * | 12/2008 | Hagerty et al. | 525/52 |
| 2013/0203908 A1 | 8/2013 | Kock et al. | |

OTHER PUBLICATIONS

PCT International Search Report and the Written Opinion Mailed Jan. 9, 2015 for Corresponding PCT/US2014/058862.

* cited by examiner

*Primary Examiner* — Ling Choi
*Assistant Examiner* — Ronald Grinsted

(57) ABSTRACT

A molded article made from and/or containing a polymeric composition made from and/or containing a high melt flow rate polypropylene homopolymer composition, a compatibilizer, a polyethylene-based elastomer, and talc is provided. An automobile part, including bumper facias, body side-molding, instrumental panels, side pillars, and door trims, with improved coefficients of linear thermal expansion is also provided.

17 Claims, No Drawings

MOLDED ARTICLES (INCLUDING AUTOMOBILE PARTS) AND RELATED FILLED THERMOPLASTIC POLYOLEFIN COMPOSITIONS

FIELD OF THE INVENTION

The present disclosure relates to molded articles made from and/or containing filled thermoplastic polyolefin compositions. The molded articles include interior and exterior automobile parts.

BACKGROUND

A major market for automotive parts includes exterior parts like bumper fascia and body side-molding and interior parts like instrument panels, door trim panels, and side pillars. Manufacturers often require that these parts have certain characteristics, such as stiffness, toughness, scratch resistance, and, in some cases, uniform surface appearance requirements.

SUMMARY OF THE INVENTION

In general embodiments, the present disclosure provides a molded article made from and/or containing a polymeric composition made from and/or containing a high melt flow rate polypropylene homopolymer composition, a compatibilizer, a polyethylene-based elastomer, and a filler. In some embodiments, the filler is talc.

In some embodiments, the present disclosure provides a molded article in the form of an automobile part, including bumper facias, body side-molding, instrumental panels, side pillars, and door trims. In some embodiments, the molded articles have an improved coefficient of linear thermal expansion.

In particular embodiments, a molded article comprises a polymeric composition having a melt flow rate from about 20 to about 45 grams/10 minutes. In some embodiments, the polymeric composition comprises:
(i) from about 10 to about 60 weight percent of a high melt flow rate polypropylene homopolymer composition comprising:
  (1) a first highly crystalline polypropylene homopolymer having:
    a melt flow rate from about 50 to about 200 grams/10 minutes,
    a polydispersity index from about 2 to about 40,
    a density from about 0.900 to about 0.950 gram/cm$^3$, and
    a xylene solubles fraction at room temperature from about 0.001 to about 3 weight percent, based upon the total weight of the first highly crystalline polypropylene homopolymer,
  (2) optionally, a second polypropylene homopolymer selected from the group consisting of:
    (A) a polypropylene homopolymer having a melt flow rate from about 200 to about 3000 grams/10 minutes and having a polydispersity index from about 2 to about 7.5, and
    (B) a second highly crystalline polypropylene homopolymer having:
      a melt flow rate from about 1 to about 5 grams/10 minutes,
      a polydispersity index from about 2 to about 7.5,
      a density from about 0.900 to about 0.950 gram/cm$^3$, and
      a xylene solubles fraction at room temperature from about 0.001 to about 2.5 weight percent,
      wherein the difference between the melt flow rate of the first highly crystalline polypropylene homopolymer (MFR$_1$) and the melt flow rate of the second polypropylene homopolymer (MFR$_2$) is at least about 40 grams/10 minutes (|MFR$_1$−MFR$_2$|≥40);
(ii) from about 3 to about 20 weight percent of a compatibilizer composition comprising a compatibilizer selected from the group consisting of:
  (A) a polypropylene-containing blend having a melt flow rate from about 1 to about 5 grams/10 minutes comprising:
    (1) from about 25 to about 90 weight percent a semicrystalline polypropylene homopolymer, and
    (2) from about 10 to about 75 weight percent an ethylene propylene rubber having a total content of ethylene-derived units in an amount ranging from about 25 to about 65 weight percent, based upon the total weight of the ethylene propylene rubber, and
  (B) a styrene-based block copolymer;
(iii) from about 5 to about 30 weight percent of a polyethylene elastomer composition comprising a polyethylene elastomer having a melt index from about 0.5 to about 2.0 grams/10 minutes and a density from about 0.800 to about 0.900 g/cm$^3$;
(iv) from about 10 to about 40 weight percent of a filler composition; and
(v) optionally, an additive composition.

In some embodiments, the filler composition is talc. In further embodiments, the additive composition comprises one or more additives.

In some embodiments, the first highly crystalline polypropylene homopolymer has a melt flow rate from about 60 to about 150 grams/10 minutes.

In some embodiments, the first highly crystalline polypropylene homopolymer has a melt flow rate from about 100 to about 130 grams/10 minutes.

In some embodiments, the extra/ultra high melt flow polypropylene homopolymer has a melt flow rate from about 1000 to about 1800 grams/10 minutes.

In some embodiments, the second highly crystalline polypropylene homopolymer has a melt flow rate from about 1 to about 3 grams/10 minutes.

In some embodiments, the compatibilizer composition comprises the polypropylene-containing blend, which polypropylene-containing blend has a melt flow rate from about 1 to about 3 grams/10 minutes.

In some embodiments, the compatibilizer composition comprises the styrene-based block copolymer, which the styrene-based block copolymer is selected from the group consisting of styrene-isobutylene-styrene block copolymer (SIBS); styrene-butadiene-styrene block copolymer (SBS); styrene-ethylene-butylene-styrene block copolymer (SEBS); styrene-isoprene-styrene block copolymer (SIS); styrene-ethylene-propylene-styrene block copolymer (SEPS); styrene-ethylene-ethylene-propylene-styrene block copolymer (SEEPS structure); and modified block copolymers thereof.

In some embodiments, the compatibilizer composition comprises the styrene-based block copolymer and the polymeric composition has a styrene content from about 0.001 to about 3 weight percent, based upon the total weight of the polymeric composition.

In some embodiments, the polyethylene elastomer of the polyethylene elastomer composition, has a density from about 0.850 to about 0.880 g/cm$^3$.

In some embodiments, the polyethylene elastomer of the polyethylene elastomer composition, is an ethylene copolymer comprising (a) ethylene-derived units and (b) alpha-olefin comonomer units derived from at least one comonomer selected from the group consisting of $C_3$ to $C_{10}$ alpha-olefins.

In some embodiments, the talc has an average particle size from about 0.1 to about 1.5 microns.

In some embodiments, the molded article is an automotive part selected from the group consisting of bumper facias, body side-molding, instrumental panels, side pillars, and door trims.

In some embodiments, the automotive part is paintable.

In some embodiments, the automotive part comprises the polymeric composition comprising an additive composition, wherein the additive composition comprises a colorant and the automotive part has a mold-in-color.

DETAILED DESCRIPTION

The present invention now will be described more fully hereinafter. However, this invention may be embodied in many different forms and should not be construed as limited to the embodiments set forth herein; rather, these embodiments are provided so that this disclosure will satisfy applicable legal requirements. As such, it will be apparent to those skilled in the art that the embodiments may incorporate changes and modifications without departing from the general scope of this invention. It is intended to include all such modifications and alterations in so far as they come within the scope of the appended claims or the equivalents thereof.

As used in this specification and the claims, the singular forms "a," "an," and "the" include plural referents unless the context clearly dictates otherwise.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Definitions

In the present description, the term "α-olefin" means an olefin of formula $CH_2$=CH—R, wherein R is a linear or branched alkyl containing from 1 to 10 carbon atoms. The α-olefin can be selected, for example, from: propylene, 1-butene, 1-pentene, 1-hexene, 1-octene, 1-dodecene and the like.

In the present description, the term "amorphous" in reference to a polyolefin means olefinic polymer having a crystallinity of about 5 weight percent or less, based upon the total weight of the olefinic polymer.

In the present description, the term "crystalline" in reference to a polyolefin means olefinic polymer having a crystallinity of more than about 70 weight percent and less than about 93 weight percent, based upon the total weight of the olefinic polymer.

In the present description, the term "highly crystalline" in reference to a polyolefin means olefinic polymer having a crystallinity of greater than about 93 weight percent, based upon the total weight of the olefinic polymer.

In the present description, the term "mold-in-color" refers to mixing and kneading a pigment, as a colorant, directly with a polymeric composition to provide a desired color to an article molded from the polymeric composition.

In the present description, the term "semi-amorphous" in reference to a polyolefin means olefinic polymer having a crystallinity of from about 5 to about 30 weight percent, based upon the total weight of the olefinic polymer.

In the present description, the term "semicrystalline" in reference to a polyolefin means olefinic polymer having a crystallinity of more than about 30 weight percent and less than about 70 weight percent, based upon the total weight of the olefinic polymer.

In the present description, the term "submicron" refers to particles having at least one dimension that is in the range of less than about 1 μm.

Testing

ASTM D 256 is entitled "Standard Test Method(s) for Determining the Izod Pendulum Impact Resistance of Plastics." The term "ASTM D 256" as used herein refers to the pendulum impact test that indicates the energy to break standard test specimens of specified size under stipulated parameters of specimen mounting, notching, and pendulum velocity-at-impact. The test specimen is held as a vertical cantilevered beam and is impacted by a swinging pendulum. The energy lost by the pendulum is equated with the energy absorbed by the test specimen. For the Notched Izod Impact Strength, the specimen is held as a vertical cantilevered beam and is broken by a pendulum; the impact occurs on the notched side of the specimen. This test method was approved on May 1, 2010 and published June 2010, the contents of which are incorporated herein by reference in its entirety. For the referenced ASTM standards, visit the ASTM website, www.astm.org, or contact ASTM Customer Service at service@astm.org.

ASTM D 790 is entitled "Standard Test Methods for Flexural Properties of Unreinforced and Reinforced Plastics and Electrical Insulating Materials." The term "ASTM D 790" as used herein refers to the determination of flexural properties by these test methods for quality control and specification purposes. Materials that do not fail by the maximum strain allowed under these test methods (3-point bend) may be more suited to a 4-point bend test. The basic difference between the two test methods is in the location of the maximum bending moment and maximum axial fiber stresses. The maximum axial fiber stresses occur on a line under the loading nose in 3-point bending and over the area between the loading noses in 4-point bending. This test method was approved on Apr. 1, 2010 and published April 2010, the contents of which are incorporated herein by reference in its entirety. For the referenced ASTM standards, visit the ASTM website, www.astm.org, or contact ASTM Customer Service at service@astm.org.

ASTM D 792 is entitled "Test Methods for Density and Specific Gravity (Relative Density) of Plastics by Displacement." The term "ASTM D 792" as used herein refers to the standard test method for determining the specific gravity (relative density) and density of solid plastics in forms such as sheets, rods, tubes, or molded items. The test method includes determining the mass of a specimen of the solid plastic in air, determining the apparent mass of the specimen upon immersion in a liquid, and calculating the specimen's specific gravity (relative density). This test method was approved on Jun. 15, 2008 and published July 2008, the contents of which are incorporated herein by reference in its entirety. For the referenced ASTM standards, visit the ASTM website, www.astm.org, or contact ASTM Customer Service at service@astm.org.

ASTM D 1238 is entitled "Test Method for Melt Flow Rates of Thermoplastics by Extrusion Plastometer." The term "ASTM D 1238" as used herein refers to the standard test method for determining melt flow rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published March 2012, the contents of which are incorporated herein by reference in its entirety. For the referenced ASTM standards, visit the ASTM website, www.astm.org, or contact ASTM Customer Service at service@astm.org.

ASTM D 3763 is entitled "Standard Test Method for High Speed Puncture Properties of Plastics Using Load and Displacement Sensors." The term "ASTM D 3763" or "Instrumented Dart Impact Test" as used herein refers to the test method covers the determination of puncture properties of rigid plastics over a range of test velocities. This test method is designed to provide load versus deformation response of plastics under essentially multiaxial deformation conditions at impact velocities. This test method further provides a measure of the rate sensitivity of the material to impact. This test method was approved on Jul. 1, 2010 and published July 2010, the contents of which are incorporated herein by reference in its entirety. For the referenced ASTM standards, visit the ASTM website, www.astm.org, or contact ASTM Customer Service at service@astm.org.

ASTM E 228 is "Standard Test Method for Linear Thermal Expansion of Solid Materials with a Push-Rod Dilatometer."

Coefficient of Linear Thermal Expansion (CLTE) is measured using a silica dilatometer. A specimen is placed inside a silica tube and silica rod is inserted into the tube. A dial gage or similar device is attached to the rod. The end of the tube containing the test specimen is placed in a constant temperature bath at a specified low temperature. After the specimen has reached the low temperature (as indicated by no movement in the dial gage), the constant temperature bath is replaced by a constant temperature bath at a specified high temperature. After the specimen has reached the high temperature, the high temperature bath is replaced by the low temperature bath. After the specimen has reached the low temperature, the specimen is removed and measured at room temperature. ASTM E 228 covers temperatures between −180 degrees Celsius and 900 degrees Celsius.

CLTE ($\alpha$) is calculated using the formula: $\alpha = \Delta L / (L_o \times \Delta T)$ where $\Delta L$ is the change in length of the specimen, $L_o$ is the original length of the specimen, and $\Delta T$ is the temperature change during the test.

Determination of Isotacticity Index (Solubility in Xylene at Room Temperature, in weight percent): 2.5 g of polymer and 250 cm$^3$ of xylene are introduced in a glass flask equipped with a refrigerator and a magnetical stirrer. The temperature is raised in 30 minutes up to the boiling point of the solvent. The obtained clear solution is then kept under reflux and stirring for further 30 minutes. The closed flask is then kept for 30 minutes in a bath of ice and water and in thermostatic water bath at 25 degrees Celsius for 30 minutes as well. The formed solid is filtered on quick filtering paper. The filtrated, 100 ml of the filtered liquid, is poured in a pre-weighed aluminum container which is heated on a heating plate under nitrogen flow to remove the solvent by evaporation. The container is then kept in an oven at 80 degrees Celsius under vacuum until constant weight is obtained. The weight percentage of polymer soluble in xylene at room temperature is then calculated.

The weight percent of polymer insoluble in xylene at room temperature is often considered as an indication of the isotacticity index of the polymer. This value corresponds substantially to the isotacticity index determined by extraction with boiling n-heptane, which by definition constitutes the isotacticity index of polypropylene.

Longitudinal and Transversal Thermal Shrinkage: A plaque of 100×200×2.5 mm is molded in an injection molding machine "SANDRETTO Series 7 190" (where 190 stands for 190 tons of clamping force).

The injection conditions are:
melt temperature=250 degrees Celsius;
mold temperature=40 degrees Celsius;
injection time=8 seconds;
holding time=22 seconds; and
screw diameter=55 mm.

The plaque is measured 3 hours and 24 hours after molding, through calipers, and the shrinkage is given by:

$$\text{Longitudinal shrinkage} = \left(\frac{200 - \text{read\_value}}{200}\right) * 100$$

$$\text{Transversal shrinkage} = \left(\frac{100 - \text{read\_value}}{100}\right) * 100$$

wherein 200 is the length (in mm) of the plaque along the flow direction, measured immediately after molding; 100 is the length (in mm) of the plaque crosswise the flow direction, measured immediately after molding; the read_value is the plaque length in the relevant direction.

An approach to increase efficiency and reduce costs in the manufacturing of molded articles, a manufacturer may decrease injection pressures, decrease molding times, and reduce wall thickness in the molds. One way to accomplish this objective is to use high melt flow rate (MFR) polypropylenes. High melt flow rate polypropylenes are propylene-based polymers having a melt flow rate greater than about 35 grams/10 minutes. However, these high MFR polypropylenes tend to be low in molecular weight, and therefore difficult to toughen, resulting in low impact strength especially at subambient temperatures.

To achieve a satisfactory balance of stiffness, toughness, and processability, one option is to combine a lower MFR polypropylene, a polyolefin modifier (typically ethylene-propylene rubber and/or plastomer), and a reinforcing filler.

In some embodiments, the molded article contains a polymeric composition that has a decreased coefficient of linear thermal expansion.

In a particular embodiment, the present disclosure provides a molded article made from and/or containing a polymeric composition having a melt flow rate from about 20 to about 45 grams/10 minutes. The polymeric composition is made from and/or containing (i) from about 10 to about 60 weight percent of a high melt flow rate polypropylene homopolymer composition,
(ii) from about 3 to about 20 weight percent of a compatibilizer composition,
(iii) from about 5 to about 30 weight percent of a polyethylene elastomer composition, and
(iv) from about 10 to about 40 weight percent of a filler composition comprising talc.

The high melt flow rate polypropylene homopolymer composition is made from and/or contains a highly crystalline polypropylene homopolymer having a melt flow rate from about 50 to about 200 grams/10 minutes, preferably, from about 60 to about 150 grams/10 minutes, more preferably, from about 100 to about 130 grams/10 minutes. The highly crystalline polypropylene homopolymer has a polydispersity index from about 2 to about 40, preferably from about 2 to about 20, and most preferably from about 2 to about 7.5. The highly crystalline polypropylene homopolymer also has a density from about 0.900 to about 0.950 gram/cm³ and a xylene solubles fraction at room temperature from about 0.001 to about 3 weight percent.

The high melt flow rate polypropylene homopolymer composition can further include a second polypropylene homopolymer which can be:
  (A) an extra/ultra high melt flow polypropylene homopolymer having a melt flow rate from about 200 to about 3000 grams/10 minutes and a polydispersity index from about 2 to about 7.5, or
  (B) a second highly crystalline polypropylene homopolymer having a melt flow rate from about 1 to about 5 grams/10 minutes, preferably from about 1 to about 3 grams/10 minutes, a polydispersity index from about 2 to about 7.5, a density from about 0.900 to about 0.950 gram/cm³, and a xylene solubles fraction at room temperature from about 0.001 to about 2.5 weight percent.

When a second polypropylene homopolymer is present, the difference between the melt flow rate of the first highly crystalline polypropylene homopolymer ($MFR_1$) and the melt flow rate of the second polypropylene homopolymer ($MFR_2$) is at least about 40 grams/10 minutes:

$$|MFR_1 - MFR_2| \geq 40.$$

When it is desirable to achieve a certain melt flow rate ($MFR^A$) for the high melt flow rate polypropylene homopolymer composition and the MFR of the first highly crystalline polypropylene homopolymer is known (MFR'), the value of MFR" of the second polypropylene homopolymer can be easily determined:

$$\ln MFR^A = (W'/W'+W'')^* \ln MFR' + (W''/W'+W'')^* \ln MFR''$$

wherein W' and W" represent the weight fractions the first highly crystalline polypropylene homopolymer and the second polypropylene homopolymer respectively. A similar calculation may be used to achieve the desired overall melt flow rate for the polymeric composition when the melt flow rate and weight fractions are known for various components in the polymeric composition.

The compatibilizer composition is made from and/or contains a compatibilizer selected from the group consisting of a polypropylene-containing blend and a styrene-based block copolymer. When the selected compatibilizer is a polypropylene-containing blend, the polypropylene-containing blend has a melt flow rate from about 1 to about 5 grams/10 minutes. More preferably, the polypropylene-containing blend has a melt flow rate from about 1 to about 3 grams/10 minutes.

The polypropylene-containing blend is made from and/or contains:
  (a) from about 25 to about 90 weight percent a semicrystalline polypropylene homopolymer, and
  (b) from about 10 to about 75 weight percent an ethylene propylene rubber having a total content of ethylene-derived units in an amount from about 25 to about 65 weight percent, based upon the total weight of the ethylene propylene rubber.

When the selected compatibilizer is a styrene-based block copolymer, suitable styrene-based block copolymers include styrene-isobutylene-styrene block copolymer (SIBS); styrene-butadiene-styrene block copolymer (SBS); styrene-ethylene-butylene-styrene block copolymer (SEBS); styrene-isoprene-styrene block copolymer (SIS); styrene-ethylene-propylene-styrene block copolymer (SEPS); styrene-ethylene-ethylene-propylene-styrene block copolymer (SEEPS structure); and modified block copolymers thereof.

Preferably, the polymeric composition has a styrene content less than about 3 weight percent, based upon the total weight of the polymeric composition. In some embodiments, the polymeric composition has a styrene content from about 0.001 to about 3 weight percent, based upon the total weight of the polymeric composition.

The polyethylene elastomer composition is made from and/or contains a polyethylene elastomer having a melt index from about 0.5 to about 2.0 grams/10 minutes and a density from about 0.800 to about 0.900 g/cm³. Preferably, the polyethylene elastomer has a density from about 0.850 to about 0.880 g/cm³. Also preferably, the polyethylene elastomer is an ethylene copolymer made from and/or containing (a) ethylene-derived units and (b) alpha-olefin comonomer units derived from at least one comonomer selected from the group consisting of $C_3$ to $C_{10}$ alpha-olefins.

The individually-described polyolefins may be prepared by conventional polymerization processes which would be apparent to a person of ordinary skill in the art. Exemplary patents describing such processes include U.S. Pat. Nos. 8,008,400, 8,039,540, and 8,227,550, the contents of which are incorporated herein by reference in their entirety. Alternatively, suitable individual polymers are commercially available through readily identifiable suppliers.

The filler composition is made from and/or contains talc. Preferably, the talc has an average particle size from about 0.1 to about 1.5 microns.

Optionally, the polymeric composition can further include an additive composition. The additive composition can be made from and/or contain one or more additives. Examples of additives, without limitation, are a coupling agent, a flame retardant, an ignition resistant additive, a stabilizer, a colorant, an antioxidant, a mold release agent, an anti-static agent, a slip-aid (i.e., slip resistance aid), a flow enhancer, a nucleating agent, a clarifying agent, and combinations thereof.

In another embodiment, the present disclosure provides a molded article as an automotive part. Preferably, the automotive parts include bumper facias, body side-molding, instrumental panels, side pillars, and door trims. Also preferably, the automotive part is paintable. Equally preferably, the automotive part will be made from and/or contain a polymeric composition having a colorant, thereby yielding a mold-in-color automotive part.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The following materials were used to prepare the exemplified thermoplastic polyolefins and the corresponding test specimen: (1) Braskem F1000HC™ homopolymer polypropylene, having a melt flow rate of 120 grams/10 minutes; (2) LyondellBasell ADSTIF™ HA801U homopolymer polypropylene, having a specific gravity of 0.90 and a melt flow rate of 65 grams/10 minutes; (3) LyondellBasell ADSTIF™ HA802H homopolymer polypropylene having a density of 0.90 g/cm³ and a melt flow rate of 2.3 grams/10 minutes; (4) LyondellBasell METOCENE™ MF650Y homopolymer polypropylene, having a specific gravity of 0.91 and a melt flow rate of 1800 grams/10 minutes; (5) LyondellBasell PROFAX™ EP390P polypropylene impact copolymer, having a specific gravity of 0.900 and a melt flow rate of 18 grams/10 minutes; (6) LyondellBasell HIFAX™ X1956 A catalloy polypropylene copolymer having a density of 0.89 g/cm$^3$, a melt flow rate of 1.2 grams/10 minutes, and an ethylene content of 13 weight percent; (7) Asahi Kasei Chemicals Corporation TUFTEC™ H1062 styrene/ethylene/butylene/styrene block copolymer having a melt flow rate of 17 grams/10 minutes and a styrene content of 18 weight percent; (8) The Dow Chemical Company XUS 38662 ethylene/butene copolymer having a density of 0.871 g/cm$^3$ and a melt index of 0.6 grams/10 minutes; (9) The Dow Chemical Company ENGAGE™ 7467 ethylene/butene copolymer having a specific gravity of 0.864 and a melt index of 1.2 grams/10 minutes; and (10) Hi-Valley Chemical, Inc. Ultra C Talc having a mean particle size of 0.65 microns. Additives included magnesium stearate, antioxidants, a nucleating agent, and a lubricant at total weight percent less than 2.0.

The materials were admixed in the weight percents, based upon the total weight of the composition, shown in Table 1.

The Comparative Example 5 was prepared with a commercially available Engineering Plastic.

TABLE 1

| Component | Ex. 1 | Ex. 2 | Ex. 3 | Ex. 4 |
|---|---|---|---|---|
| F1000HC PP | 17 | | | |
| HA801U PP | | 51 | 35.2 | 10 |
| HA802H PP | | 3.5 | | |
| MF650Y PP | 7 | | 7 | 13 |
| EP390P PP copolymer | 20 | | | 19 |
| X1956 A PP catalloy copolymer | | | 5 | 5 |
| H1062 SEBS | | 4 | | |
| XUS 38662 PE | 19.5 | | | |
| 7467 PE | | 15 | 25 | 17.5 |
| Talc | 34 | 25 | 25 | 33 |

TABLE 2

| | Ex. 1 | Ex. 2 | Ex. 3 | Ex. 4 | C. Ex. 5 |
|---|---|---|---|---|---|
| Application Type | P* | P Test | MIC** | MIC | |
| MFR (g/10 min) | 30 | 30 | 20 | 27 | 14 |
| Density (g/cm$^3$) | 1.16 | 1.08 | 1.07 | 1.17 | 1.07 |
| Flex Modulus (Mpa) | 2700 | 3000 | 2300 | 2400 | 2300 |
| Notched Izod @ +23 degrees Celsius (kJ/m$^2$) | 30 | 20 | 40 | 35 | 18 |
| CLTE, Parallel to Flow, −30 to 100 degrees Celsius (mm/mm/degrees Celsius) | 2.7 × 10−5 | 3.5 × 10−5 | 2.7 × 10−5 | 2.6 × 10−5 | |
| CLTE, Perpendicular to Flow, −30 to 100 degrees Celsius (mm/mm/degrees Celsius) | 2.7 × 10−5 | 3.6 × 10−5 | 2.6 × 10−5 | 2.2 × 10−5 | |
| Mold Shrinkage (%) | 0.35 | 0.45 | 0.55 | 0.50 | 0.55 |

P*—Painted
MIC**—Mold-In-Color

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A molded article comprising a polymeric composition
   (a) having a melt flow rate from about 20 to about 45 grams/10 minutes and
   (b) comprising:
      (i) from about 10 to about 60 weight percent of a high melt flow rate polypropylene homopolymer composition comprising:
         (1) a first highly crystalline polypropylene homopolymer having a melt flow rate from about 50 to about 200 grams/10 minutes, a polydispersity index from about 2 to about 40, a density from about 0.900 to about 0.950 gram/cm3, and a xylene solubles fraction at room temperature from about 0.001 to about 3 weight percent, based upon the total weight of the first highly crystalline polypropylene homopolymer,
         (2) optionally, a second polypropylene homopolymer selected from the group
            (A) an extra/ultra high melt flow polypropylene homopolymer having a melt flow rate from about 200 to about 3000 grams/10 minutes and a polydispersity index from about 2 to about 7.5 and
            (B) a second highly crystalline polypropylene homopolymer having a melt flow rate from about 1 to about 5 grams/10 minutes, a polydispersity index from about 2 to about 7.5, a density from about 0.900 to about 0.950 gram/cm3, and a xylene solubles fraction at room temperature from about 0.001 to about 2.5 weight percent,
      wherein the difference between the melt flow rate of the first highly crystalline polypropylene homopolymer (MFR1) and the melt flow rate of the second polypropylene homopolymer (MFR2) is at least about 40 grams/10 minutes (|MFR1−MFR2|≥40);
(ii) from about 3 to about 20 weight percent of a compatibilizer composition comprising a compatibilizer selected from the group consisting of
(A) a polypropylene-containing blend having a melt flow rate from about 1 to about 5 grams/10 minutes comprising
(1) from about 25 to about 90 weight percent a semicrystalline polypropylene homopolymer and
(2) from about 10 to about 75 weight percent an ethylene propylene rubber having a total content of ethylene-derived units in an amount from about 25 to about 65 weight percent, based upon the total weight of the ethylene propylene rubber, and
(B) a styrene-based block copolymer;
(iii) from about 5 to about 30 weight percent of a polyethylene elastomer composition comprising a polyethylene elastomer having a melt index from about 0.5 to about 2.0 grams/10 minutes and a density from about 0.800 to about 0.900 g/cm3;
(iv) from about 10 to about 40 weight percent of a filler composition comprising talc; and
(v) optionally, an additives composition having one or more additives.

2. The molded article of claim 1 wherein the first highly crystalline polypropylene homopolymer has a melt flow rate from about 60 to about 150 grams/10 minutes.

3. The molded article of claim 1 wherein the first highly crystalline polypropylene homopolymer has a melt flow rate from about 100 to about 130 grams/10 minutes.

4. The molded article of claim 1 wherein the extra/ultra high melt flow polypropylene homopolymer has a melt flow rate from about 1000 to about 1800 grams/10 minutes.

5. The molded article of claim 1 wherein the second highly crystalline polypropylene homopolymer has a melt flow rate from about 1 to about 3 grams/10 minutes.

6. The molded article of claim 1 wherein (a) the compatibilizer composition comprises the polypropylene-containing blend and (b) the polypropylene-containing blend has a melt flow rate from about 1 to about 3 grams/10 minutes.

7. The molded article of claim 1 wherein (a) the compatibilizer composition comprises the styrene-based block copolymer and (b) the styrene-based block copolymer is selected from the group consisting of styrene-isobutylene-styrene block copolymer (SIBS); styrene-butadiene-styrene block copolymer (SBS); styrene-ethylene-utylene-styrene block copolymer (SEBS); styrene-isoprene-styrene block copolymer (SIS); styrene-ethylene-propylene-styrene block copolymer (SEPS); styrene-ethylene-thylene-propylene-styrene block copolymer (SEEPS structure); and modified block copolymers thereof.

8. The molded article of claim 1 wherein (a) the compatibilizer composition comprises the styrene-based block copolymer and (b) the polymeric composition has a styrene content from about 0.001 to about 3 weight percent, based upon the total weight of the polymeric composition.

9. The molded article of claim 1 wherein the polyethylene elastomer of the polyethylene elastomer composition, has a density from about 0.850 to about 0.880 g/cm3.

10. The molded article of claim 1 wherein the polyethylene elastomer of the polyethylene elastomer composition, is an ethylene copolymer comprising (a) ethylene-derived units and (b) alpha-olefin comonomer units derived from at least one comonomer selected from the group consisting of $C_3$ to $C_{10}$ alpha-olefins.

11. The molded article of claim 1 wherein the talc has an average particle size from about 0.1 to about 1.5 microns.

12. The molded article of claim 1 being an automotive part selected from the group consisting of bumper facias, body side-molding, instrumental panels, side pillars, and door trims.

13. The molded article of claim 12 wherein the automotive part is paintable.

14. The molded article of claim 12 wherein (a) the polymeric composition comprises the additive composition, (b) the additive composition comprises a colorant, and (c) the automotive part has a mold-in-color.

15. A molded article comprising a polymeric composition
(a) having a melt flow rate from about 20 to about 45 grams/10 minutes and
(b) comprising:
(i) from about 10 to about 60 weight percent of a high melt flow rate polypropylene homopolymer composition comprising:
(1) a first highly crystalline polypropylene homopolymer having a melt flow rate from about 50 to about 200 grams/10 minutes, a polydispersity index from about 2 to about 40, a density from about 0.900 to about 0.950 gram/cm$^3$, and a xylene solubles fraction at room temperature from about 0.001 to about 3 weight percent, based upon the total weight of the first highly crystalline polypropylene homopolymer; and
(2) a second polypropylene homopolymer selected from the group
(A) an extra/ultra high melt flow polypropylene homopolymer having a melt flow rate from about 200 to about 3000 grams/10 minutes and a polydispersity index from about 2 to about 7.5 and
(B) a second highly crystalline polypropylene homopolymer having a melt flow rate from about 1 to about 5 grams/10 minutes, a polydispersity index from about 2 to about 7.5, a density from about 0.900 to about 0.950 gram/cm3, and a xylene solubles fraction at room temperature from about 0.001 to about 2.5 weight percent,
wherein the difference between the melt flow rate of the first highly crystalline polypropylene homopolymer (MFR1) and the melt flow rate of the second polypropylene homopolymer (MFR2) is at least about 40 grams/10 minutes (|MFR$_1$−MFR$_2$|≥40);
(ii) from about 3 to about 20 weight percent of a compatibilizer composition comprising a compatibilizer selected from the group consisting of
(A) a polypropylene-containing blend having a melt flow rate from about 1 to about 5 grams/10 minutes comprising
(1) from about 25 to about 90 weight percent a semicrystalline polypropylene homopolymer and
(2) from about 10 to about 75 weight percent an ethylene propylene rubber having a total content of ethylene-derived units in an amount from about 25 to about 65 weight percent, based upon the total weight of the ethylene propylene rubber, and
(B) a styrene-based block copolymer;
(iii) from about 5 to about 30 weight percent of a polyethylene elastomer composition comprising a polyethylene elastomer having a melt index from about 0.5 to about 2.0 grams/10 minutes and a density from about 0.800 to about 0.900 g/cm3;
(iv) from about 10 to about 40 weight percent of a filler composition comprising talc; and
(v) optionally, an additives composition having one or more additives.

16. The molded article of claim 15, wherein the second polypropylene homopolymer comprises the extra/ultra high melt flow polypropylene homopolymer.

17. The molded article of claim 15, wherein the second polypropylene homopolymer comprises the second highly crystalline polypropylene homopolymer.

* * * * *